3,154,974
CUTTING TOOL
Walter J. Greenleaf, R.D. 3, Meadville, Pa.
Filed Mar. 23, 1962, Ser. No. 183,325
6 Claims. (Cl. 77—58)

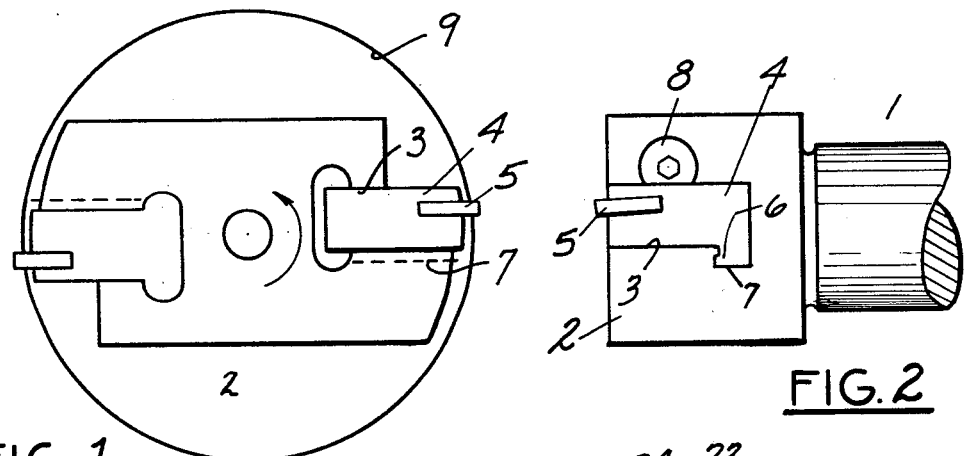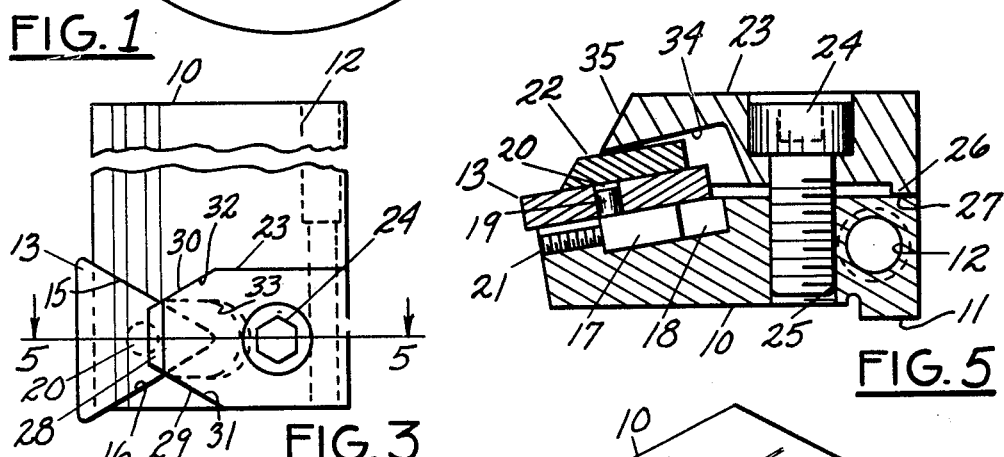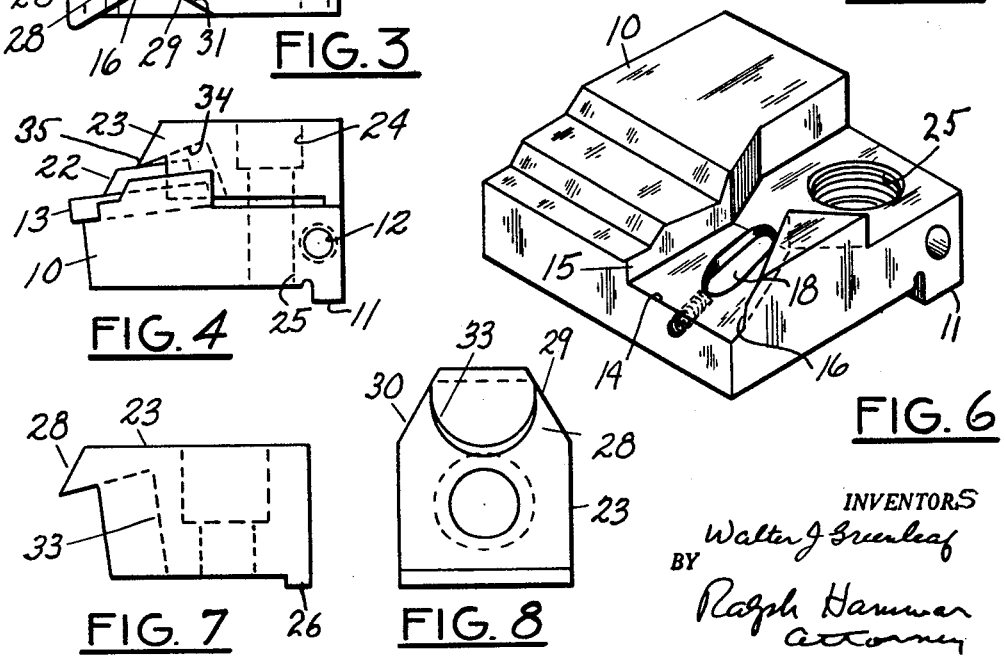

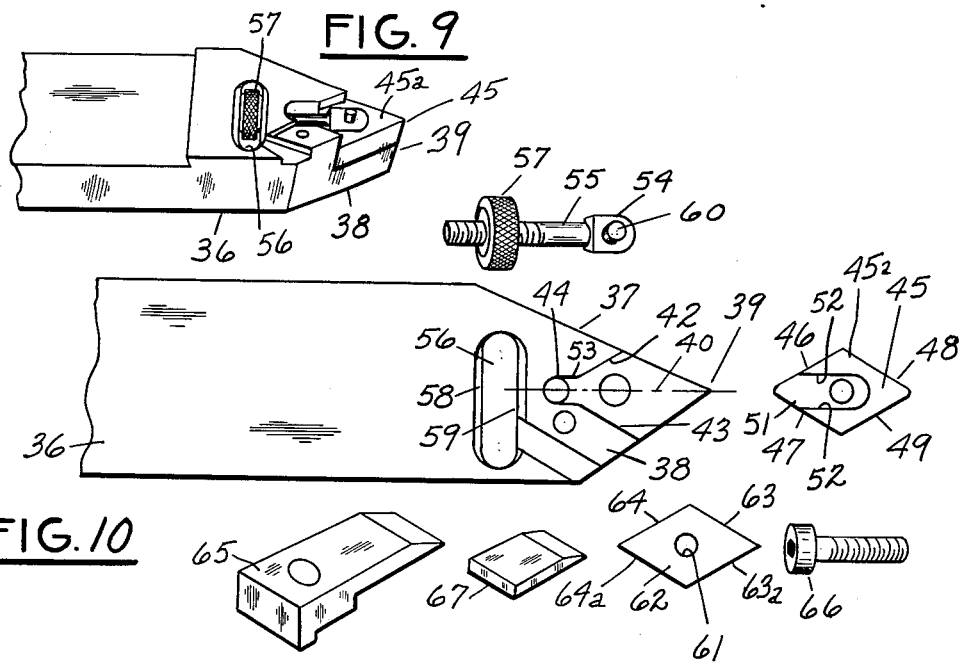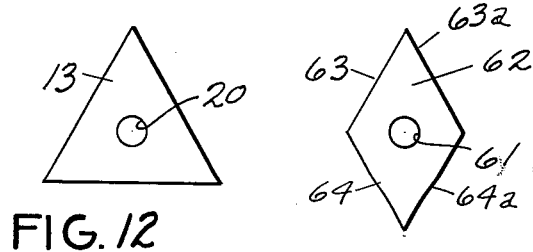

This invention is a construction for cutting tools with replaceable clamped bits which is particularly advantageous in boring tools and tracing tools.

In the drawing,

FIG. 1 is an end view of a boring tool,

FIG. 2 is a side view,

FIG. 3 is a top view of a cartridge for use in a boring bar,

FIG. 4 is an edge view of the cartridge,

FIG. 5 is a section on line 5—5 of FIG. 3,

FIG. 6 is a perspective of the body of the cartridge,

FIG. 7 is a side view of the bit clamp,

FIG. 8 is a bottom view of the clamp,

FIG. 9 is a top plan view of a tracer tool with the bit, chip breaker and bit clamp removed, FIG. 10 is an exploded view of the tracer tool with the parts grouped around the body, FIG. 11 is a longitudinal section through the tip, FIG. 12 is a top view of the bit for FIGS. 3–5, and FIG. 13 is a top view of the bit for FIGS. 9–11.

FIGS. 1 and 2 show a boring tool having a spindle 1 and a head 2 provided at diametrically opposite sides with notches 3 for removable cartridges 4 carrying cutting bits 5, the cartridges having projections 6 slidable along keyways 7 in the head 2 to adjust the radial projection of the cutting bits. Suitable clamps indicated diagrammatically at 8 hold the cartridges in the head. When the tool is machining a bore of diameter indicated by the circle 9, it will be noted that there is limited space for chip removal particularly in the vicinity of the bits.

FIGS. 3–5 show a cartridge construction for use in the boring tool of FIGS. 1 and 2 and in other locations where space for chip removal is limited. The cartridge has a body 10 having at its back a projection 11 receivable in keyway 7 in the head. At one end and above the projection 11 is a tapped hole 12 for an adjusting screw by which the cartridge can be positioned along the keyway 7. At the front of the body 10 is a triangular indexable bit 13 of hard metal such as one of the carbides. The bit has symmetrical sides so that it can be indexed or turned on its axis and can also be turned end for end to bring successively into cutting position six symmetrically disposed cutting edges. The bit rests on a bottom seat 14 in the body 10 and is located by engagement of its edges with converging edge seats 15 and 16 machined in the body 10 normal to the bottom seat 14. The bit is pulled back tightly against the converging seats 15 and 16 by a key 17 slidably received in a keyway 18 in the bottom seat 14. The key has an upstanding tongue 19 projecting into a central hole 20 in the bit equally spaced from all of the cutting edges. A set screw 21 engages the front end of the key and forces the key backward along its keyway 18 thereby pulling the bit tightly against the seats 15 and 16 and insuring accurate indexing. Ordinarily only a very slight movement of the key 17 is necessary to bring the edges of the bit into perfect engagement with the seats 15 and 16. When a chip breaker such as shown at 22 is used, it overlies the rear part of the bit and is located by the same seats 15 and 16. It is not necessary that the chip breaker be pulled tightly back against the seats 15 and 16.

During cutting, it is necessary that the bit 15 be held tightly against the bottom seat 14 and to do this the clamping force should be exerted near the center of the bit so that there will be no tendency for the bit to tilt or rock on the bottom seat. In the present construction, this is accomplished by a clamp 23 tightened by a screw 24 threaded into a tapped hole 25 in the body 10. The screw 24 is to the rear of the bit but in front of the key projection 11. At the back, the clamp has a depending rib 26 which engages a flat surface 27 at the rear of the body 10. At the front the clamp has a tapered nose 28 with vertical converging sides 29 and 30. The sides 29 and 30 are illustrated as respectively parallel to the seats 15 and 16 but need not be parallel to the seats. The edges 29 and 30 are preferably, but not necessarily, seated against surfaces 31 and 32 in the cartridge body 10. When the nose 28 of the clamp is seated between the surfaces 31 and 32, it is supported and located by the cartridge body. On the under side of the nose 28 is an end milled bore or recess 33 which intersects the converging edges 29 and 30 substantially at the junction between the seats 15, 32 and 16, 31. The recess 33 provides a pocket for receiving the rear tip of the bit 13 and for the rear end of the chip breaker 22. The recess 33 is bored at an angle such that the bottom surface 34 of the bore clears the upper surface of the chip breaker 22. This insures that the clamping force will always be exerted at the forward end 35 of the nose of the clamp. Although the clamping force is exerted through a section of the clamp which is very thin as shown in FIG. 5, the construction of the clamp is such that it has adequate strength. Note that on both sides of the bore 33 the clamp extends substantially the full depth, thereby providing reinforcing material for the nose of the clamp. The reinforcement does not cut down on the space for chip removal because it is on both sides of the rear end of the bit. By this construction it is possible to have the tip 35 of the clamp which exerts the clamping force very thin because of the reinforcement provided by the material in the clamp which depends around the rear end of the bit.

The tracer tool of FIGS. 9–11 has a body 36 having at the front symmetrically disposed sides 37, 38 converging to a tip 39 centered on a longitudinal axis 40. In the tip is a recess having sides 42, 43 starting from points equidistant from the tip 39 and converging toward a point 44 on the axis 40. Mounted in the recess is a diamond shaped seat 45 having rear edges 46, 47 flush with the sides 42, 43. The seat 45 is anchored to the body by a screw 50 extending up from the bottom and when anchored is effectively part of the body but may be easily removed and replaced in case of wear or damage. The upper side 45a of the seat 45 serves as a bottom seat for a bit. Recessed into the upper side of the seat 45 is a rearwardly extending keyway 51 having sides 52 centered on the axis 40 and extending toward a slot 53 in the body. Slidably seated in the keyway 51 below the upper side 45a of the seat 45 is a key 54 fixed to the outer end of a screw 55 extending rearwardly into a nut 57 in a cross slot 56. The nut cooperates with sides 58, 59 of the cross slot 56 to exert a thrust on the screw 55 moving the key 54 forward and backward along the keyway 51. The key 54 has an upstanding pin 60 which projects up through a central hole 61 in a diamond shaped bit 62. Accordingly, as the key 54 is moved back and forth along the keyway 51, the pin 60 effects a corresponding movement of the bit. The screw 55 acts as a draw bar pulling the bit backward to locate it in cutting position and pushing the bit forward for ease of changing or indexing.

The bit has two sets of cutting edges 63, 63a and 64, 64a, each of the same length and making the same angle with the axis 40. When installed in the cutter body, one set of cutting edges is received between the sides 42, 43 with the rear tip of the bit projecting into the slot 53 while the other set of cutting edges registers with the sides 37, 38 of the tip 39. During tracing the cutting edges registering with the tip 39 are the active cutting edges while the cutting edges received in the slot 53 are inactive. By turning the tool end for end, the inactive edges may be brought into cutting position.

In tracing, accuracy is of great importance. It is accordingly highly desirable that the inactive cutting edges be brought solidly against the sides 42, 43 in order that the bit may be precisely located. This is accomplished by the screw and nut associated with the key 54 which pulls the bit straight back against the sides. By bringing the inactive cutting edges solidly against the sides 42, 43, precise location of the bit is achieved. When the bit is to be indexed so that the inactive cutting edges may be brought into cutting positon, the nut 57 is loosened, moving the bit forward so that it may be easily removed from the notch and turned to the new cutting position.

After the bit is located in cutting position and pulled back solidly against the sides 42, 43, it is securely anchored in place by a top clamp 65, tightened against the upper side of the bit by a screw 66. A chip breaker 67 may be used between the clamp and the bit if desired.

In both of the cutting tools, there is an indexable bit with cutting edges symmetrically disposed about a central hole extending through the bit and a point between two inactive cutting edges is pulled back solidly against seats converging to the rear of the active cutting edges so that precise location of the bit is achieved. After the bit is precisely located, it is then clamped solidly against an end or bottom seat to preserve the accurate positioning of the bit. The structure for pulling the bit back into position is recessed below the seat upon which the bit rests and is thereby protected from the cutting thrusts. The length of the bits is less than any other dimension.

This application is a continuation in part of application Serial No. 795,164, filed February 24, 1959, now abandoned.

What is claimed as new is:

1. A cutting tool for use with bits having top and bottom end faces and side edges defining symmetrically disposed points which may successively be brought into cutting position as the bit is indexed, comprising a body having a bottom seat for the bit and having edge seats converging toward the rear of the bottom seat for engaging side edges of one of the points of the bit, said edge seats being spaced apart to allow said one point of the bit engaged thereby to project rearwardly beyond said edge seats, said body having to the rear of said edge seats other edge seats converging toward the front of the bottom seat, a clamp at the rear of said body having at its front a nose projecting over the bit for clamping the bit against said bottom seat, and said nose having on its under side a pocket open at the front to receive said one point of the bit and depending at the sides and back around said one point of the bit, and the depending sides of said nose fitting against said other edge seats.

2. A cutting tool for use with bits having top and bottom end faces and side edges defining symmetrically disposed points which may successively be brought into cutting position as the bit is indexed, comprising a body having a bottom seat for the bit and having edge seats converging toward the rear of the bottom seat for engaging side edges of one of the points of the bit, said edge seats being spaced apart to allow said one point of the bit engaged thereby to project rearwardly beyond said edge seats, said body having to the rear of said edge seats other edge seats converging toward the front of the bottom seat and respectively parallel to one and the other of said first edge seats, a clamp at the rear of said body having at its front a nose projecting over the bit for clamping the bit against said bottom seat, and said nose having on its under side a pocket open at the front and bottom to receive said one point of the bit and closed at the sides and back and depending around said one point of the bit, and the depending sides of said nose fitting against said other edge seats.

3. A cutting tool having an indexable throw away polygonal bit of length less than any other dimension and with top and bottom end faces and side edges defining symmetrically disposed points which may successively be brought into cutting position as the bit is indexed and a hole at the center of the end faces and equally spaced from said points, a body having a bottom seat for the bit and having edge seats projecting above and converging toward the rear of the bottom seat for engaging side edges of one of the points of the bit, said edge seats being spaced apart to allow said one point of the bit engaged thereby to project rearwardly beyond said edge seats, a keyway in the body below the bottom seat and extending toward the rear of the bottom seat between said edge seats, a key in the keyway below the bottom seat and having a projection extending upward into said hole in the bit, and means for moving the key to force the bit against said edge seats.

4. A cutting tool having an indexable throw away polygonal bit of length less than any other dimension and with top and bottom end faces and side edges defining symmetrically disposed points which may successively be brought into cutting position as the bit is indexed and a hole at the center of the end faces and equally spaced from said points, a body having a bottom seat for the bit and having edge seats projecting above and converging toward the rear of the bottom seat for engaging side edges of one of the points of the bit, said edge seats being spaced apart to allow said one point of the bit engaged thereby to project rearwardly between said edge seats, a keyway in the body below the bottom seat and extending toward the rear of the bottom seat between said edge seats, a key in the keyway below the bottom seat, a projection on the key extending above the bottom seat into said hole in the bit, a slot in the body to the rear of said edge seats, a screw fixed to the key extending between said edge seats and into the slot, and a nut in the slot for moving the screw.

5. A cutting tool having an indexable throw away polygonal bit of length less than any other dimension and with top and bottom end faces and side edges defining symmetrically disposed points which may successively be brought into cutting position as the bit is indexed and a hole at the center of the end faces and equally spaced from said points, a body having a bottom seat for the bit and having edge seats projecting above and converging toward the rear of the bottom seat for engaging side edges of one of the points of the bit, a keyway in the body below the bottom seat and extending toward the rear of the bottom seat between said edge seats, a key in the keyway below the bottom seat, a projection on the key extending above the bottom seat into said hole in the bit, a cross slot in the body to the rear of said edge seats, a screw fixed to the key extending into the cross slot, and a nut in the slot for moving the screw.

6. A cutting tool having an indexable throw away polygonal bit, of length less than any other dimension and with top and bottom end faces and side edges defining symmetrically disposed points which may successively be brought into cutting position as the bit is indexed and a hole at the center of the end faces and equally spaced from said points, a body having a bottom seat for the bit and having edge seats projecting above and converging toward the rear of the bottom seat for engaging side edges of one of the points of the bit, a keyway in the body below the bottom seat and extending toward the rear of the bottom seat between said edge seats, a key in the keyway below the bottom seat, a projection on the key extending above the bottom seat into said hole in the bit, and means for moving the key along the keyway.

References Cited in the file of this patent

UNITED STATES PATENTS

| | | |
|---|---|---|
| 2,500,387 | Sheridan | Mar. 14, 1950 |
| 2,883,737 | Wilson | Apr. 28, 1959 |
| 2,911,707 | Almen | Nov. 10, 1959 |

FOREIGN PATENTS

| | | |
|---|---|---|
| 989,307 | France | May 23, 1951 |
| 1,105,369 | France | June 29, 1955 |
| 1,138,824 | France | Feb. 4, 1957 |
| 323,999 | Switzerland | Oct. 15, 1957 |
| 810,197 | Great Britain | Mar. 11, 1957 |

OTHER REFERENCES

"Kennametal." Catalog No. 54, November 1953; page 38 relied on.